June 3, 1924.

A. H. LEIPERT 1,496,237

CUSHION CONNECTION FOR VEHICLE CONSTRUCTION

Filed Sept. 6, 1923

INVENTOR
August H. Leipert
BY
Redding, Greeley, & Shent Campbell
ATTORNEYS

Patented June 3, 1924.

1,496,237

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed September 6, 1923. Serial No. 661,157.

*To all whom it may concern:*

Be it known that I, AUGUST H. LEIPERT, a citizen of the United States, residing in the borough of Queens of the city of New York, in the State of New York, have invented certain new and useful Improvements in Cushion Connections for Vehicle Construction, of which the following is a specification, reference being had to the accompanying drawing, forming a part hereof.

This invention relates to the type of connection and support disclosed by Patent No. 1,404,876 dated January 31, 1922, and application for Letters Patent of the United States, Serial No. 476,994, in both of which it is proposed to support and connect one metal part of a motor vehicle with another through non-metallic yielding means. In bringing all of the parts into correct relation to insure the most advantageous results a careful machining and skillful assembling might ordinarily be required. This is particularly true, for instance, where a vehicle spring is to have the improved connection associated therewith and is to be connected to the frame with capacity for elongation without liability of disengagement with the associated fittings. In order to eliminate the degree of care in manufacture and skill in assembly which would otherwise be required it is proposed in accordance with the present invention to provide means associated with one or another of the parts whereby they may all be brought finally into the most effective working relation. The invention is not to be limited to the character of the means thus provided nor as to whether they co-operate directly with the non-metallic yielding material or with the supported element or with the supporting element so long as the capacity for adjustment is such that the supported part is connected in proper relation to the supporting part by the improved connection. For convenience in pointing out the principle underlying the invention and the most important use now known for it, the drawings have shown its embodiment with the spring mounting of a motor vehicle in which semi-elliptical springs of conventional form are connected to the frame of a motor vehicle with capacity for elongation in a manner which will be understood. Further, this embodiment discloses adjustable devices carried by a housing in which the non-metallic yielding material is confined and adapted to cooperate directly with the material in order to effect the desired adjustment of the mean effective length between the connections at opposite ends of the spring, but this application of the invention is merely by way of illustration of the principle involved since it is evident that the housing itself might be adjusted bodily with respect to the frame or some other means employed for finally changing the effective relation of the parts after initial manufacture and assembling.

Referring to the accompanying drawings.

Figure 1:
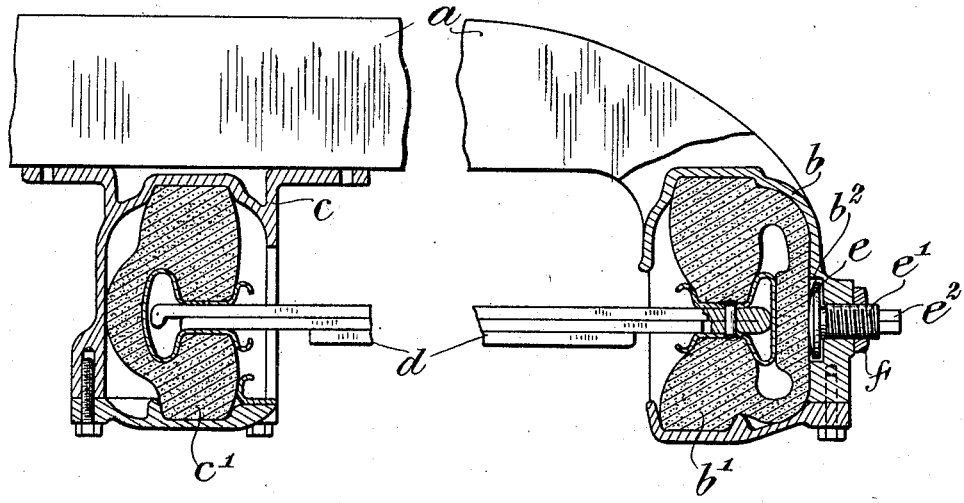
Figure 1 is a view in vertical section through housings carried on a vehicle frame and confining non-metallic yielding blocks by which the vehicle spring is connected to the frame, adjustment in accordance with the invention being illustrated as applied to one of the housings.

As was pointed out hereinbefore, and as will be emphasized later, the invention is not to be limited to the particular application shown in the drawings since the adjustment means consitituting the subject matter thereof may be employed usefully with other connections embodying the principle disclosed by said patent and by said application and may be found in some other relationship to the elements connected than that occupied by the particular means illustrated. The side frame member $a$ of the chassis of a motor vehicle may carry thereon housings $b$, $c$, in which are confined blocks $b'$, $c$, of non-metallic yielding material, as of rubber, by which the ends of the vehicle spring $d$ are engaged so effectively as to constitute a non-metallic connection and support between the spring and frame. While a great degree of flexibility is afforded by the improved connection to the end that the spring $d$ may elongate freely it will be evident to one skilled in the art that the problem is presented of so manufacturing the engaged parts and of so assembling them that they will co-operate in the desired manner and always function efficiently. The expense and difficulty, however, of insuring this relation after manufacture and upon assembly are such as to make it advisable in some constructions to provide for a final degree of adjustment between parts such as will take care of irregularities or clearances found even between standards. The invention, therefore, resides broadly in providing such means and finds its simplest embodiment in the form of an adjustable seat $e$ of relatively large superficial area carried on a screw $e'$ threaded through the end wall of one or both of the housings $b$, $c$, and provided with a squared end $e^2$ or other suitable means for conveniently turning the screw to effect the desired positioning of the seat $e$. The area and form of the seat $e$ may be varied to suit requirements but it will be observed from Figure 1 that the adjusting screw $e'$ therefor is preferably disposed substantially in prolongation of the spring $d$ so that movement of the seat $e$ towards and away from the end of the spring will be most effective in changing the mean effective distance between the connections $b'$, $c'$. It may be desirable in the interest of latitude of adjustment to form a recess $b^2$ in the end wall of the housing $b$ to receive the seat $e$, as shown in Figure 1, and while the seat in this condition forms essentially a continuation of the rear wall of the housing $b$ it may be projected out of the recesses $b^2$ in towards the end of the spring $d$ to shorten the effective point of application of the connection $b'$, as shown clearly in Figure 2. A lock nut $f$ may be employed to maintain the screw with the seat in the desired adjusted position.

One of the preferred characteristics of the improved type of non-metallic connection and support is that the material thereof is confined within the housing $b$ under compression. Nevertheless in the case of a spring connection it is proposed to make at least one of the blocks if not both of such shape as to flex freely to accommodate elongations of the spring. For this reason, the seat $e$ which is formed as a plate or abutment engaging part of the block $b'$ may be moved to displace the material of the block when an adjustment is desired.

Figure 2:
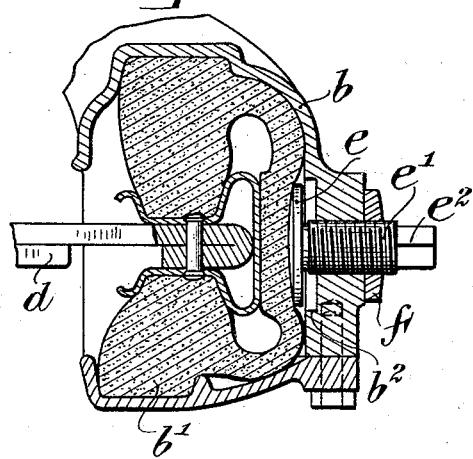
Figure 2 is a view in section on a somewhat larger scale of the housing shown at the right side of Figure 1.
Figure 3:
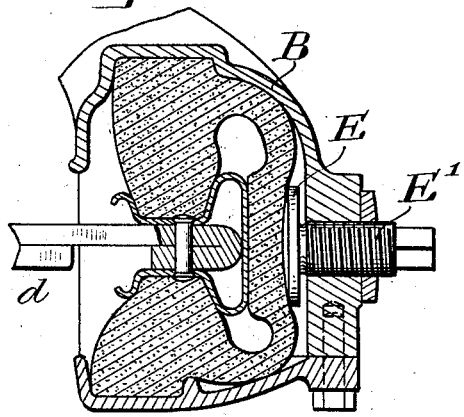
Figure 3 is a view of a slightly modified embodiment of the invention.

The modified construction shown in Figure 3 differs slightly from that shown in Figures 1 and 2 in that the recess $b^2$ previously described is omitted and the seat E always lies within the surface of the rear wall of the housing B. Otherwise, the adjustment provided is the same.

Details of construction may be changed as is evident. For instance, the screw $e'$ need not be integral with the seat $e$ to be adjusted nor need the seat $e$ be formed, as indicated, of circular form with a spherical face. It is believed, however, that these features are conducive to convenient manipulation of the parts.

Under the conditions disclosed in said application referred to an adjustment of the general character sought to be covered hereby may be desirable for the reasons pointed out generally herein. Further, the adjustment in either instance need not be formed as a movable member carried in the housing or its equivalent and engaging directly with the non-metallic yielding material since it is conceivable that the housing might be carried adjustably on a bracket mounted on one of the connected elements. Indeed, other adjustments may occur to one skilled in the art to provide for a convenient change in relation between the associated elements but all such reversals and substitutions are to be deemed within the broad intent of this invention as recited in the appended claims.

What I claim is:

1. In combination with two metallic parts of a motor vehicle, one of which parts is to be connected to and supported by the other of said parts and a wholly non-metallic connection and support interposed operatively therebetween, adjustable means to move the non-metallic connection and support with respect to said metallic parts.

2. In combination with two metallic parts of a motor vehicle, one of which parts is to be connected to and supported by the other of said parts and a wholly non-metallic connection and support interposed operatively therebetween, means to adjust the effective relation between said non-metallic connection and support and said two metallic parts, said means comprising a movable abutment carried by one of said metallic parts and engaging said non-metallic connection for displacement thereof with respect to the other of said metallic parts.

3. In combination with two metallic parts of a motor vehicle, one of which parts is to be connected to and supported by the other of said parts and a wholly non-metallic connection and support interposed operatively therebetween, means to adjust the effective relation between said non-metallic connection and support and said two metallic parts, said means including a screw rod carried with one of said metallic parts, an abutment carried with said screw rod and engaging the non-metallic connection and support for displacement thereof with respect to the other of said metallic parts.

4. In combination with two metallic parts of a motor vehicle one of which parts is to be connected to and supported by the other of said parts, a non-metallic connection and support interposed therebetween and comprising a block of non-metallic yielding material, a housing secured to the supporting metallic part and holding said block against displacement with respect thereto and adjustable means carried with said housing and engaging said block to displace the latter with respect to the other of said metallic parts.

5. In combination with a wholly non-metallic connection and support interposed two metallic parts of a motor vehicle, one of which parts is to be connected to and supported by the other of said parts, and comprising a block of non-metallic yielding material confined under compression, means incorporated within the block to permit free flexing thereof, and adjustable means cooperating with the block to displace it with respect to said metallic parts.

6. In combination with the spring and frame of a motor vehicle and a wholly non-metallic connection and support interposed between each end of the spring and the frame and comprising a block of non-metallic yielding material, adjustable means to move the blocks with respect to each other.

7. In combination with the spring and frame of a motor vehicle and a wholly non-metallic connection and support interposed between each end of the spring and the frame and comprising a block of non-metallic yielding material, adjustable means to move it with respect to the other.

8. In combination with the spring and frame of a motor vehicle and a wholly non-metallic connection and support interposed between each end of the spring and the frame and comprising a block of non-metallic yielding material and an abutment carried with the frame and engaging one of said blocks and means to move the abutment adjustably in prolongation of the spring to displace the block and change the mean effective distance between the blocks.

9. In combination with the spring and frame of a motor vehicle and a wholly non-metallic connection and support interposed between each end of the spring and the frame and comprising a block of non-metallic yielding material, a screw rod mounted adjustably with the frame and in substantial prolongation of the spring, means to move the screw rod towards and away from the spring, a plate carried with the inner end of the screw rod and engaging the block to displace it with respect to the end of the spring and means to lock the plate in adjusted position.

This specification signed this 4th day of September A. D. 1923.

AUGUST H. LEIPERT.